US011003765B2

(12) United States Patent
Park et al.

(10) Patent No.: US 11,003,765 B2
(45) Date of Patent: May 11, 2021

(54) CONTAINER-BASED INTEGRATED MANAGEMENT SYSTEM

(71) Applicant: Tmax A&C Co., Ltd., Seongnam-si (KR)

(72) Inventors: Sanghoon Park, Suwon-si (KR); Dongnuck Kwak, Seongnam-si (KR)

(73) Assignee: TMAX A&C CO., LTD, Gyeonggi-do (KR)

(*) Notice: Subject to any disclaimer, the term of this patent is extended or adjusted under 35 U.S.C. 154(b) by 356 days.

(21) Appl. No.: 16/053,236

(22) Filed: Aug. 2, 2018

(65) Prior Publication Data

US 2019/0377871 A1 Dec. 12, 2019

(30) Foreign Application Priority Data

Jun. 11, 2018 (KR) ........................ 10-2018-0066643

(51) Int. Cl.
*G06F 21/55* (2013.01)
*H04L 29/08* (2006.01)
*H04L 29/06* (2006.01)

(52) U.S. Cl.
CPC ........ *G06F 21/552* (2013.01); *H04L 63/1425* (2013.01); *H04L 63/20* (2013.01); *H04L 67/125* (2013.01)

(58) Field of Classification Search
CPC ... G06F 21/552; H04L 63/1425; H04L 63/20; H04L 67/125
See application file for complete search history.

(56) References Cited

U.S. PATENT DOCUMENTS 9,275,065 B1 * 3/2016 Ganesh ................. G06F 16/122
10,142,353 B2 * 11/2018 Yadav ................. H04L 63/1408
(Continued)

FOREIGN PATENT DOCUMENTS

| JP | 4725724 B2 | 7/2011 |
| KR | 10-2011-003468 A | 1/2011 |

(Continued)

OTHER PUBLICATIONS

Korean Intellectual Property Office, Office Action, dated Sep. 25, 2019.

*Primary Examiner* — J. Brant Murphy
*Assistant Examiner* — Stephen T Gundry
(74) *Attorney, Agent, or Firm* — Umberg Zipser LLP

(57) ABSTRACT

Disclosed is a computer program that is used for detecting a system abnormality and controlling a causative service in a computing device. In a computer program stored in a computer-readable storage medium, including encoded commands, which causes one or more processors to perform operations for detecting a system abnormality in the computing device when the computer program is executed by the one or more processors of a computer device, the operations may include: an operation of receiving monitoring information for each client from a plurality of clients of the computing device; an operation of comparing each monitoring information for each client with a system monitoring policy; an operation of determining whether the system abnormality occurs based on a comparison result with the system monitoring policy; and an operation of determining to control some clients among the plurality of clients based on the determination of whether the system abnormality occurs.

10 Claims, 12 Drawing Sheets

(56) References Cited

U.S. PATENT DOCUMENTS

| | | | |
|---|---|---|---|
| 10,560,309 B1* | 2/2020 | Chitalia | H04L 41/069 |
| 2010/0064342 A1* | 3/2010 | Nakagawa | G06F 21/552 |
| | | | 726/1 |
| 2011/0217335 A1 | 9/2011 | Winssinger et al. | |
| 2016/0080420 A1* | 3/2016 | Ray | H04L 63/0263 |
| | | | 726/1 |
| 2016/0350173 A1* | 12/2016 | Ahad | G06F 11/3072 |
| 2016/0359872 A1* | 12/2016 | Yadav | H04L 43/0894 |
| 2016/0378389 A1* | 12/2016 | Hrischuk | G06F 3/0631 |
| | | | 711/154 |
| 2017/0199770 A1* | 7/2017 | Peteva | G06F 9/5088 |
| 2017/0250919 A1* | 8/2017 | Kessel | H04L 67/1097 |
| 2017/0251013 A1* | 8/2017 | Kirti | H04L 63/1441 |
| 2017/0353499 A1* | 12/2017 | Huang | G06F 9/45558 |
| 2017/0359306 A1* | 12/2017 | Thomas | H04L 63/145 |
| 2018/0114016 A1 | 4/2018 | Lee et al. | |
| 2019/0081963 A1* | 3/2019 | Waghorn | H04L 63/1441 |
| 2019/0081983 A1* | 3/2019 | Teal | H04L 63/14 |
| 2019/0158347 A1* | 5/2019 | Tee | H04L 63/029 |
| 2019/0215332 A1* | 7/2019 | Kaplan | H04L 47/00 |
| 2019/0222594 A1* | 7/2019 | Davis, III | H04L 41/0816 |
| 2019/0294778 A1* | 9/2019 | De Gaetano | G06F 21/567 |
| 2019/0342315 A1* | 11/2019 | Smelov | H04L 43/06 |
| 2020/0028867 A1* | 1/2020 | Monsen | G06F 21/566 |

FOREIGN PATENT DOCUMENTS

| | | |
|---|---|---|
| KR | 10-1059199 B1 | 8/2011 |
| KR | 101585342 B1 | 1/2016 |
| KR | 101743269 B1 | 6/2017 |
| KR | 101767454 B1 | 8/2017 |
| KR | 101799412 B1 | 11/2017 |
| KR | 10-1810762 B1 | 12/2017 |

\* cited by examiner

| CLIENT | CPU USAGE | FILE EXTENSION CHANGE NUMBER | NOTIFICATION |
|---|---|---|---|
| C1 | 50% | 18 | OFF |
| C2 | 76% | 25 | ON |
| C3 | 70% | 15 | OFF |
| C4 | 65% | 21 | OFF |
| C5 | 70% | 22 | ON |
| C6 | 74% | 28 | ON |
| C7 | 75% | 32 | ON |
| C8 | 30% | 4 | OFF |
| C9 | 16% | 1 | OFF |
| C10 | 72% | 23 | ON |

CONTAINER-BASED INTEGRATED MANAGEMENT SYSTEM

CROSS-REFERENCE TO RELATED APPLICATIONS

This application claims priority to and the benefit of Korean Patent Application No. 10-2018-0066643 filed in the Korean Intellectual Property Office on Jun. 11, 200x, the entire contents of which are incorporated herein by reference.

TECHNICAL FIELD

The present disclosure relates to an integrated management system, and more particularly, to an integrated management system in which a computing device detects abnormal actions of a plurality of clients and controls a causative service.

BACKGROUND ART

The existing computing environment which relies on independent hardware performance of each terminal according to technological development of a computer network has evolved to a cloud computing type that utilizes all computing resources on a network and provides a corresponding service to be simply and easily used according to a request of a user terminal. Currently, cloud computing technology is widely used in a server and system configuration due to an advantage that IT resources can be shared with each other and idle resources can be efficiently used when constructing an IT infrastructure. Virtualization technology is one of the core based technologies of cloud computing and open server virtualization technologies that are widely used in a server field include Xen, KVM, VirtualBox, and so on, which are called a virtual machine (VM) or hypervisor basis. Virtual machine-based server virtualization technology is a scheme that installs an operating system (hereinafter, referred to as a host OS) on a physical server, creates a virtual machine thereon by dividing resources based on the hypervisor, and then installs an operating system (hereinafter referred to as a guest OS) and drives a desired application program again. Such a scheme has an advantage in that multiple servers independently operable can be provided in one physical system, but has a disadvantage in that when the host OS and the guest OS are operating in the same operating system, the waste of resources is large.

Accordingly, in recent years, a container scheme, which is a virtualization technology of a different scheme from the virtual machine scheme, is popular. The container-based system is much lighter than the virtual machine scheme because the container-based system shares an operating system kernel, and as a result, the container-based system has better mobility, faster startup times, and occupies much less memory than full booting of the operating system. In such a cloud service environment, virtual machine servers and resources are selected and used as many as desired at a desired time through a cloud system in which required resources including a CPU, a memory, a storage, an application program, and the like are provided by a virtual technology, and as a result, high economical efficiency and expandability and advanced services can be provided, but when a malicious attack or intrusion from the outside occurs while the application is executed, a host operating system may be directly damaged, causing security and stability and guarantee problems.

Accordingly, there is a need in the art for a policy-based management system for detecting an abnormal action of a user through individual monitoring of each client computer against a plurality of clients connected to a computing device and controlling the cause service.

SUMMARY OF THE INVENTION

The present disclosure has been made in an effort to provide an integrated management system in which a computing device detects system abnormalities occurring in a plurality of clients and controls a cause service.

An exemplary embodiment of the present disclosure provides a computer program stored in a computer-readable storage medium, including encoded commands, which causes one or more processors to perform the following operations for detecting a system abnormality in the computing device when the computer program is executed by the one or more processors of a computer device, in which the operations may include: an operation of receiving monitoring information for each client from a plurality of clients of the computing device; an operation of comparing each monitoring information for each client with a system monitoring policy; an operation of determining whether the system abnormality occurs based on a comparison result with the system monitoring policy; and an operation of determining to control some clients among the plurality of clients based on the determination of whether the system abnormality occurs.

Alternatively, the monitoring information may include at least one of resource information including information related with the resource of the client and operation information including information related with the operation of the client.

Alternatively, the system monitoring policy may include at least one of a resource policy related with the resource of the client and an operation policy related with the operation of the client.

Alternatively, the resource policy may include a policy related to whether the resource usage or the remaining amount of the client fluctuates to a predetermined threshold value or more for a predetermined first time period and the operation policy may include a policy related to the operation of the client to the storage space and may include a policy related to whether the predetermined operation occurs at a predetermined number of times or more for a predetermined second time period.

Alternatively, the operation of determining whether the system abnormality occurs based on the comparison result with the system monitoring policy may include an operation of determining that the system abnormality occurs when the number of clients violating the system monitoring policy is equal to or more than a predetermined number.

Alternatively, the operation of comparing each of the monitoring information for each client with the system monitoring policy may include an operation of comparing a change amount of the resource information of the monitoring information for each client with a predetermined threshold change amount of the resource policy of the system monitoring policy and an operation of determining that the client violates the system monitoring policy when the amount of change in the resource information is equal to or more than the predetermined threshold change amount of the resource policy.

Alternatively, the operation of comparing each of the monitoring information for each client with the system monitoring policy may include an operation of comparing the operation information of the monitoring information for each client with the operation policy of the system monitoring policy and an operation of determining that the client violates the operation policy when the operation information includes information that violates the operation policy.

Alternatively, the operation of determining to control some clients of the plurality of clients based on the determination as to whether the system abnormality occurs may include an operation of determining to control at least one group of a client group in which the abnormality occurs and a client group in which the abnormality does not occur among the plurality of clients based on the type of occurring system abnormality.

Alternatively, the operation of determining to control at least one group of the client group in which the abnormality occurs and the client group in which the abnormality does not occur among the plurality of clients based on the type of occurring system abnormality may include an operation of determining to control the client group in which the abnormality occurs when the type of occurring system abnormality is an abnormality which influences the client in which the abnormality occurs itself and an operation of determining to control at least one group of the client group in which the abnormality occurs and the client group in which the abnormality does not occur when the type of occurring system abnormality is an abnormality which influences another client.

Alternatively, the control for the client may include at least one of device control, file control, process control, and network control for some clients of the plurality of clients.

According to another exemplary embodiment of the present disclosure, a method for detecting a system abnormality, which is performed by a computing device may include: receiving monitoring information for each client from a plurality of clients of the computing device; comparing each monitoring information for each client with a system monitoring policy; determining whether the system abnormality occurs based on a comparison result with the system monitoring policy; and controlling some clients among the plurality of clients based on the determination of whether the system abnormality occurs.

According to yet another exemplary embodiment of the present disclosure, a computing device for detecting a system abnormality may include: a processor including one or more cores; a memory storing commands executable by the processor; and a network unit permitting communication with a plurality of clients, in which the processor may receive monitoring information for each client from a plurality of clients of the computing device, compare each monitoring information for each client with a system monitoring policy, determine whether the system abnormality occurs based on a comparison result with the system monitoring policy, and determine to control some clients among the plurality of clients based on the determination of whether the system abnormality occurs.

According to an exemplary embodiment of the present disclosure, an integrated management system can be provided, which detects system abnormalities which occur in a computing device and controls a causative service.

BRIEF DESCRIPTION OF THE DRAWINGS

Various aspects are now described with reference to the drawings and like reference numerals are generally used to designate like elements. In the following exemplary embodiments, for a purpose of description, multiple specific detailed matters are presented to provide general understanding of one or more aspects. However, it will be apparent that the aspect(s) can be executed without the detailed matters.

FIG. 6 is an exemplary diagram related to a data table indicating whether system abnormalities occur which may provided to an administrator of a computing device according to an exemplary embodiment of the present disclosure.

DETAILED DESCRIPTION

Figure 1A:
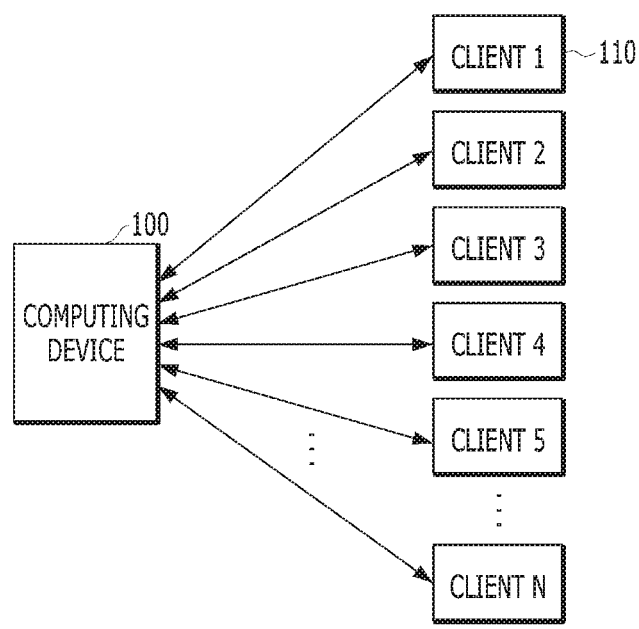
FIG. 1A is a conceptual diagram illustrating an overall system of a computing device that detects system abnormalities occurring in a plurality of clients and controls a causative service according to an exemplary embodiment of the present disclosure.

Various exemplary embodiments will now be described with reference to drawings and like reference numerals are used to refer to like elements throughout all drawings. In the present specification, various descriptions are presented to provide appreciation of the present disclosure. However, it is apparent that the exemplary embodiments can be executed without the specific description. In other examples, known structures and apparatuses are presented in a block diagram form in order to facilitate description of the exemplary embodiments.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or the execution thread and one component may be localized in one computer or distributed among two or more computers. Further, the components may be executed by various computer-readable media having various data structures, which are stored therein. The components may perform communication with another system through local and/or remote processing according to a signal (for example, data from one component that interacts with other components and/or data from other systems through a network such as the Internet through a signal in a local system and a distribution system) having one or more data packets, for example.

It should be appreciated that the word "comprises" and/or "comprising" means that the corresponding feature and/or component is present, but presence or addition of one or more other features, components, and/or a group thereof is not excluded. Further, when not separately specified or not clear in terms of the context that a singular form is indicated, it should be construed that the singular form generally means "one or more" in the present specification and the claims.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is consistent with the principles and new features presented herein.

FIG. 1A is a conceptual diagram illustrating an overall system of a computing device 100 that detects system abnormalities from a plurality of clients and controls a causative service according to an exemplary of the present disclosure.

According to an exemplary embodiment of the present disclosure, the computing device 100 may detect system abnormalities in a plurality of clients and control the plurality of clients based on the detected system abnormalities. Specifically, the computing device 100 may determine whether the system abnormalities which occur in the plurality of clients occur. In this case, whether the system abnormalities occurs may be determined based on a comparison of monitoring information and system monitoring policies for respective clients 110 from the plurality of clients connected to the computing device 100. In more detail, the computing device 100 may receive the monitoring information for each client 110 from the plurality of clients connected to the computing device 100. In addition, the computing device 100 may receive a system monitoring policy for identifying an abnormal action from an administrator. That is, the computing device 100 may determine whether the system abnormality occurs based on a comparison result between the monitoring information received from the plurality of clients and the system monitoring policy set based on an input of the administrator. In addition, when the computing device 100 determines that the system abnormality occurs, the computing device 100 may perform a plurality of control operations on some of the plurality of clients connected to the computing device 100.

Accordingly, the computing device 100 may detect the abnormal actions of the plurality of clients connected to the computing device 100 and when the abnormal action is detected, the computing device 100 performs an operation of controlling the plurality of clients to prevent the abnormal actions of individual clients from being transitioned to a network through the computing device 100 and prevent additional threats that may occur due to the abnormal actions.

The computing device 100 according to an exemplary embodiment of the present disclosure synthesizes the monitoring information from each client so that in spite of an operation other than the abnormal operation for each of individual clients, when a change occurs in the monitoring information concurrently in the plurality of clients, it is determined that a system is abnormal to detect the system abnormality which may be propagated through the network, such as ransomware or the like and take a control operation.

According to the embodiment of the present disclosure, it is possible to prevent the abnormal behavior of the individual client from being transferred to the network by the abnormal behavior detection and the client control operation. By preventing the transition of the abnormal behavior of the individual client, the computing device 100 can protect the assets of the system. By protecting the system assets, the processing performance of the system can be prevented from deteriorating, and the processing performance of the system can be improved.

Figure 1B:
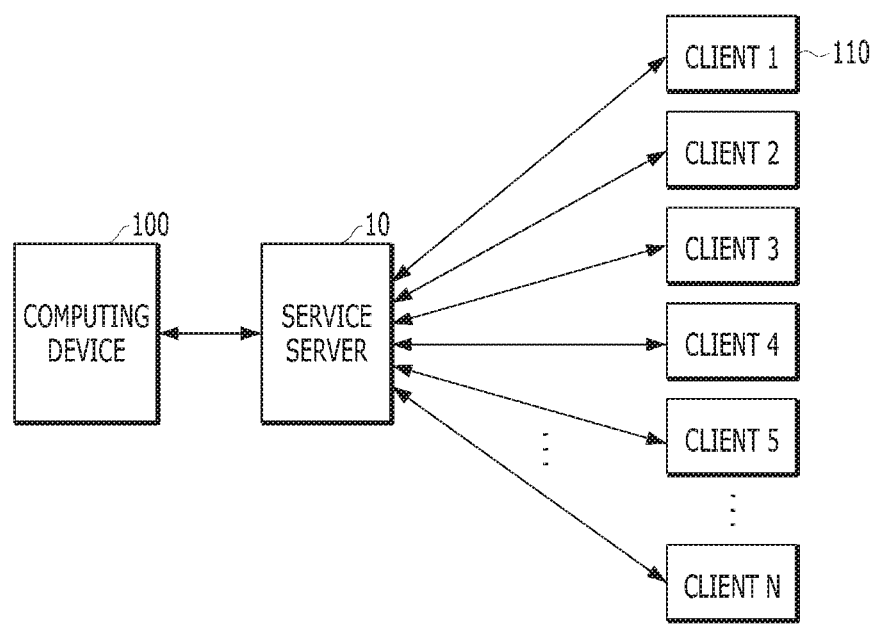
FIG. 1B is a conceptual diagram illustrating an overall system of a computing device that detects system abnormalities occurring in a service server and controls a causative service according to an exemplary embodiment of the present disclosure.

FIG. 1B is a conceptual diagram illustrating an overall system of a computing device that detects system malfunctions occurring in a service server and controls a causative service according to another exemplary embodiment of the present disclosure.

According to an exemplary embodiment of the present disclosure, the computing device 100 may transmit and receive information to and from a service server 10 through wired and/or wireless interconnection.

According to an exemplary embodiment of the present disclosure, the computing device 100 may detect the system abnormality which occurs in the service server 10 and control the plurality of clients connected to the service server 10 based on the detected system abnormality. More specifically, the computing device 100 may determine whether the system is abnormal based on the comparison of the monitoring information and the system monitoring policies for the respective clients 110 from the plurality of clients connected to the service server 10. In more detail, the computing device 100 may receive from the service server 10 the monitoring information for each client 110 from the plurality of clients connected to the service server 10. In addition, the computing device 100 may receive from the administrator the system monitoring policies for identifying the abnormal actions which occur from the plurality of clients. That is, the computing device 100 may compare the monitoring information for each client 110 received from the service server 10 and the system monitoring policy set based on the input of the administrator and determine whether the system abnormality occurs based on the comparison result. In addition, when the computing device 100 determines that the system abnormality occurs, the computing device 100 may transmit control information to control the plurality of clients to the service server 10. That is, the monitoring information for each client for the respective clients may be compared with the system monitoring policies, respectively and the computing device 100 compares the monitoring information for the respective clients with the system monitoring policies, respectively to determine whether there is a plurality of clients which violates the system monitoring policy.

Accordingly, the computing device 100 may detect the abnormal actions of the plurality of clients connected to the service server 10 and when the abnormal action is detected, the computing device 10 transmits a control operation of controlling the plurality of clients to the service server 10 and the service server 10 performs an operation of controlling the plurality of clients to prevent the abnormal actions of the individual clients from being transitioned to the network through the service server 10 and prevent additional threats that may occur due to the abnormal actions.

According to an exemplary embodiment of the present disclosure, the service server 10 may be a cloud computing service. More specifically, the service server 10 as a kind of Internet-based computing may be a cloud computing service that processes information with another computer connected to the Internet rather than a computer of a user. The cloud computing service is a service that stores data on the Internet and which the user may use anytime and anywhere through the Internet connection without installing required data or programs on the computer thereof and may easily share and transfer data stored on the Internet by simple manipulation and click. Further, the cloud computing service is a service which may perform a desired task by using a function of an application program provided by the web without separately installing a program in addition to simply storing the data in a server on the Internet and may perform the task while simultaneously sharing documents by multiple persons. In addition, the cloud computing service may be implemented in the form of at least one of an infrastructure as a service (IaaS), a platform as a service (PaaS), software as a service (SaaS), and a virtual machine-based cloud server and a container-based cloud server. That is, the service server 10 of the present disclosure may be implemented in at least one form of the above-described cloud computing services. Concrete description of the cloud computing service is merely an example and the present disclosure may include an arbitrary platform for building a cloud computing environment. The concrete description that the service server 10 is implemented as the container-based cloud server 300 and the virtual machine-based cloud server 400 will be described below with reference to FIGS. 3 and 4.

Figure 2:
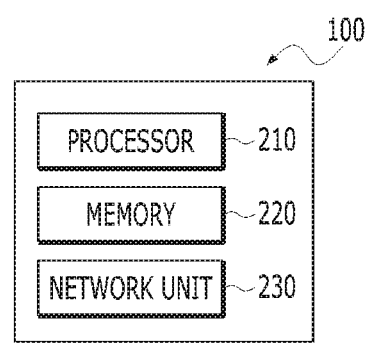
FIG. 2 is a block diagram of the computing device according to an exemplary embodiment of the present disclosure.

FIG. 2 is a block diagram of the computing device according to an exemplary embodiment of the present disclosure.

Components of the computing device 100 illustrated in FIG. 2 are exemplary. Only some of the components illustrated in FIG. 2 may constitute the computing device 100. Further, an additional component(s) may be included in the computing device 100 in addition to the components illustrated in FIG. 2.

As illustrated in FIG. 2, the computing device 100 may include a processor 210, a memory 220, and a network unit 230.

According to an exemplary embodiment of the present disclosure, the processor 210 may receive the monitoring information of each of the plurality of clients connected to the computing device 100. In this case, the monitoring information may include resource information and operation information. The resource information included in the monitoring information may be information on a change quantity of resources which the plurality of respective clients connected to the computing device 100 uses for driving the application. For example, the resource information may include information on a utilization rate and a usage time of a CPU, a memory, a hard disk, or a network, which are changed when a client 110 operates the application. The operation information included in the monitoring information may be information on operations performed by the plurality of respective clients connected to the computing device 100. Specifically, in the case of the operation information, the application executed by each client may include information which is changed based on at least one of an installation action, a deletion action, and a control action of the client 110. As a specific example, the basic container information may include information that the application is changed by at least one of the installation action, the deletion action, a change action, a connection action, a release action, and an access action of the client 110 for a device, a file, a process, a network, and a shared directory operated in the application. The concrete description of the resource information and the operation information described above is only an example and the present disclosure is not limited thereto.

According to another exemplary embodiment of the present disclosure, the processor 210 may receive the monitoring information of each of the plurality of clients connected to the computing device 100 through a database. For example, the database may be Tibero of Tmax data. In more detail, the processor 210 may determine whether the system for each client is abnormal based on the information received from the plurality of clients. As a result, since the computing device 100 needs to receive the monitoring information from all clients connected to the computing device 100, a larger load amount may be caused. Accordingly, the computing device 100 may receive the monitoring information of each of the plurality of clients in association with the database. More specifically, the monitoring information transmitted from the client may be stored in the database and the computing device 100 may request and receive required information from the database in which the monitoring information is stored. The computing device 100 receives the monitoring information of the plurality of clients with a small load amount through the database to detect the abnormal actions of the individual clients.

According to an exemplary embodiment of the present disclosure, the processor 210 may set the system monitoring policy based on the input of the administrator. In this case, the system monitoring policy may include a resource policy related with the resource of the client and an operation policy related with the operation of the client. The resource policy may include, for example, a policy related with whether a resource usage or a remaining amount of the client varies equal to or more than a predetermined threshold value during a predetermined period. More specifically, the resource policy may be a policy regarding a resource change quantity for a predetermined time of each of the plurality of clients connected to the computing device 100. For example, in a case where the resource usage of the client is changed by 50% or more for 10 seconds, the resource policy may be a policy to determine that the case is the abnormality. Further, for example, in a case where the resource usage of the client is more than the threshold value, the resource policy may be a policy to determine that the case is the abnormality. The operation policy may include a policy related to an operation of the client 110 with respect to a storage space and may include a policy related to whether a predetermined action occurs a predetermined number of times or more during a predetermined period. More specifically, the operation policy may be a policy as to whether the number of times that an administrator-specified operation occurs is exceeded within a predetermined time with respect to each of the plurality of clients of the computing device 100. For example, in a case where 10 file change operations occur in each of the plurality of clients for 5 seconds, the operation policy may be a policy for determining the case as a policy violation. As another example, the operation policy may be set based on 15 file change operations in each of the plurality of clients for 3 seconds. The description of the resource policy and the operation policy is only an example and the present disclosure is not limited thereto.

According to an exemplary embodiment of the present disclosure, the processor 210 may compare the monitoring information for each client with the system monitoring policy. More specifically, the processor 210 may compare a change amount of the resource information of the monitoring information for each client with a predetermined threshold change amount of the resource policy of the system monitoring policy. For example, when a resource policy as to whether the usage of the CPU is more than 70% for 10 minutes in each client is set in the processor 210, information on the CPU usage is received from each client for 10 minutes which is previously set to compare whether the usage of the CPU is more than 70%. Specific numerical values relating to the resource policy are merely examples and the present disclosure is not limited thereto.

The processor 210 may compare the operation information of the monitoring information for each client and the operation policy of the system monitoring policy. In detail, the monitoring information received from each client may be compared based on the operation policy set in the processor 210. For example, when an operation policy as to whether the number of change times of a specific file is more than 30 for 5 seconds in each client is set in the processor 210, information on the file change is received from each client for 5 sec. which is previously set to compare whether the number of file change times is more than 30. Specific numerical values relating to the operation policy are merely examples and the present disclosure is not limited thereto. That is, the processor 210 may separately compare the resource information and the resource policy and the operation information and the operation policy.

According to an exemplary embodiment of the present disclosure, the processor 210 may determine whether the system abnormality occurs based on the comparison result of the monitoring information and the system monitoring policy. More specifically, the processor 210 may determine that the system abnormality occurs when the number of clients that violate the system monitoring policy among the plurality of clients is equal to or more than a predetermined number. Specifically, the processor 210 may determine the client that violates the system monitoring policy based on the comparison result of the monitoring information for each client and the system monitoring policy. In this case, the monitoring information may include the resource information and the operation information and the system monitoring policy may include the resource policy and the operation policy. In other words, the processor 210 separately compares the resource information and the resource policy and the operation information and the operation policy to determine whether the resource information and the operation information violate the resource policy and the operation policy. For example, when the CPU usage of the client is equal to or more than 70%, if only the corresponding client has such monitoring information (CPU usage 70% or more), the corresponding client may perform a task requiring a lot of resources (that is, a normal operation). However, when the CPU usages of multiple clients concurrently increase, the computing device 100 may determine that the system abnormality occurs based on monitoring information that the CPU usages of the multiple clients concurrently increase.

The processor 210 compares the resource information of each client with the resource policy to determine the client that violates the resource policy. Specifically, the processor 210 may determine that the client violates the resource policy when the resource change amount is equal to or more than a predetermined threshold change amount of the resource policy. For example, when the processor 210 pre-sets a resource policy that limits the CPU usage to 60% based on the input of the administrator, if the CPU usage of each client monitored in real time is 60% or more, the processor 210 may determine that the client with the CPU usage of 60% or more violates the resource policy. The concrete description of the resource information and the resource policy described above is only an example and the present disclosure is not limited thereto.

The processor 210 compares the operation information of each client with the operation policy to determine the client that violates the operation policy. Specifically, when the operation information of each client includes information that violates a predetermined operation policy, the processor 210 may determine that the client violates the operation policy. For example, when the operation policy preset through the processor 210 is set based on an operation of performing file deletion 20 times for 3 seconds, in a case where the file deletion is performed 26 times for 3 seconds in the operation information of the specific client, the processor 210 may determine that the specific client violates the operation policy. The concrete description of the operation information and the operation policy described above is only an example and the present disclosure is not limited thereto.

That is, the processor 210 compares the monitoring information received from the plurality of clients connected to the computing device 100 with the predetermined system monitoring policy to determine a client that violates the system monitoring policy and when the number of determined clients is equal to or more than a predetermined number, the processor 210 may determine that the system abnormality occurs.

Hereinafter, a specific exemplary embodiment in which the processor 210 determines whether the system abnormality occurs will be described with reference to FIG. 6.

FIG. 6 is an exemplary diagram related to a data table indicating whether system malfunctions occur which may provided to an administrator of a computing device according to an exemplary embodiment of the present disclosure.

According to an exemplary embodiment of the present disclosure, the computing device 100 may provide to the administrator information relating to the system abnormality. In this case, the information provided to the administrator may be provided in the form of a data table as illustrated in FIG. 6 or may be provided in the form of a user interface (UI). As described above, the monitoring information collected by the client may be stored in the database in the form of the database table as illustrated in the example of FIG. 6.

As illustrated in FIG. 6, information on a real-time situation of each client provided to the administrator may include at least one of information (reference numeral 610) on the client connected to the computing device 100, information (reference numeral 620) on the resource usage for each client, monitoring information (reference numeral 630) according to a file operation policy for each client, and notification information (reference numeral 640) according to abnormality detection. The information illustrated in FIG. 6 may be information displayed based on the system monitoring policy set by the administrator. Specifically, the information illustrated in FIG. 6 may be a system monitoring policy that is generated based on the threshold change amount of the CPU for a predetermined time and a file extension change number for a predetermined time by the administrator. For example, when the administrator sets the system monitoring policy based on a threshold change amount in memory for a predetermined time and a specific file deletion number for a predetermined time, a memory usage may be displayed in an area of reference numeral 620 and the specific file deletion number may be displayed in an area of reference numeral 630. That is, it will be apparent to those skilled in the art that the information illustrated in FIG. 6 is only an example, and the present disclosure is not limited thereto.

According to an exemplary embodiment of the present disclosure, the processor 210 may generate the system monitoring policy based on the input of the administrator. For example, the processor 210 may generate a case where the usage of the CPU is 70% and the number of clients in which 20 file extension changes or more occur within 5 seconds is equal to or more than 5 as the system monitoring policy based on the input of the administrator. In other words, the processor 210 may determine that the system abnormality occurs in the case where the usage of the CPU is 70% or more and the number of clients in which 20 file extension changes or more occur within 5 seconds is equal to or more than 5. The diagram illustrated in FIG. 6 is an exemplary diagram based on the system monitoring policy described above.

Referring to FIG. 6, it can be seen that ten clients are connected to the computing device 100, as shown in the area of reference numeral 610. Further, information (reference numeral 620) on the CPU usage, information (reference numeral 630) on the file extension change number, and notification information (reference numeral 640) according to the abnormality detection for each of 10 clients may be displayed. For example, the CPU usage and the file extension change number of client 1 that is, C1 may be displayed as 50% and 18 based on the monitoring information for C1, respectively. That is, the processor 210 may determine that C1 does not violate the predetermined system monitoring policy (CPU usage 70% or more and 20 file extension changes or more). Therefore, "OFF" may be displayed in the notification information indicating the anomaly detection. As another example, the CPU usage and the file extension change number of C2 may be displayed as 76% and 25 based on the monitoring information for C2, respectively. That is, the processor 210 determines that C2 violates the predetermined system monitoring policy (CPU usage 70% or more and 20 file extension changes or more), and as a result, "ON" may be displayed in the notification information indicating the anomaly detection. As yet another example, in the case of C3, since the usage of the CPU is 70%, that is, equal to or more than the CPU usage (70%) of the predetermined policy, but the file extension change number is 15, that is, less than the predetermined policy (15 file extension changes), the processor 210 may determine that C3 does not violate the predetermined system monitoring policy and display "OFF" in the notification information. Through the process of determining whether the system monitoring policy is violated, the processor 210 may determine whether the system monitoring policy is violated for each of the plurality of (for example, ten) clients connected to the computing device 100.

In a case where the number of clients which violate the system monitoring policy among the plurality of clients connected to the computing device 100 is equal to or more than a predetermined number, the processor 210 may determine that the system abnormality occurs. For example, in a case where the number of clients violating the system monitoring policy is predetermined as '5', the processor 210 of the computing device 100 illustrated in FIG. 6 may determine that the system abnormality occurs. As another example, in a case where the number of clients violating the system monitoring policy is predetermined as '4', the processor 210 of the computing device 100 illustrated in FIG. 6 may determine that the system abnormality does not occur.

That is, the processor 210 may compare the monitoring information with the system monitoring policy to determine whether each client violates the system monitoring policy and when the number of clients that violate the system monitoring policy is equal to or more than the predetermined number, the processor 210 may determine that the system abnormality occurs. Through the configuration of the processor 210, the computing device 100 may detect not only the system abnormalities occurring in the individual clients 110 but also the system abnormalities in local environments of the individual clients 110.

Since the restriction on the number of clients 110 determined to violate the system monitoring policy may be predetermined by the administrator, the restriction may be set differently according to the type of system abnormality to be detected. More specifically, when the system abnormality to be detected through the processor 210 is a system abnormality expected to cause serious damage, the restriction on the number of clients 110 that violate the system monitoring policy is minimized and when the system abnormality to be detected through the processor 210 is a system abnormality expected not cause the serious damage, the restriction on the number of clients 110 that violate the system monitoring policy may be more relaxed and predetermined. As a specific example, when a response is delayed, such as ransomware, in the case of a system abnormality which causes the serious damage to the entire network, a threshold value of the number of clients violating the monitoring policy, which is used for determining the system abnormality may be set to be small so that the processor 210 determines that the system abnormality occurs immediately when even one client violates the system monitoring policy. On the other hand, in the case where the abnormal action to be detected is not expected to cause the serious damage to the plurality of clients, a determination condition is relaxed so that when 20 clients violate the system monitoring policy, the processor 210 may be set to determine that the system abnormality occurs. Therefore, it is possible to set individual conditions for each type of system abnormality.

According to an exemplary embodiment of the present disclosure, the processor 210 may determine to control some clients among the plurality of clients based on the determination of whether the system abnormality occurs. In more detail, the processor 210 may determine to control at least one group of a client group in which the abnormality occurs and a client group in which the abnormality does not occur among the plurality of clients, based on the type of occurring system abnormality. For example, if the occurring system abnormality is the ransomware, the processor 210 may determine to control the client group in which the abnormality occurs. In this case, the processor 210 may block the network connection of the client group already infected with the ransomware. The processor 210 may primarily shut down the driving of the ransomware by terminating and restarting the instance of the client group when the file change by the ransomware continues in the client group infected with the ransomware. As another example, when the occurring system abnormality is a malware infection due to a security fault, the processor 210 may determine to control the client group in which the abnormality does not occur. The concrete description of the system abnormality is merely an example and the present disclosure is not limited thereto.

According to an exemplary embodiment of the present disclosure, the processor 210 may control some clients among the plurality of clients. More specifically, the processor 210 may perform a plurality of control operations for some clients among the plurality of clients. The plurality of control operations may include at least one of the device control operation, the file control operation, the process control operation, and the network control operation. In this case, the device control operation as an operation of controlling a device connected to the terminal of the client connected to the computing device 100 may include at least one of a USB connection control, a smart phone connection control, a Bluetooth device control, an FDD device control, a DVD device control, an infrared control, a printer control, and a port control, for example. Further, the file control operation as an operation of controlling files and directories executed in the client terminal connected to the computing device 100 may include at least one of random file and directory deletion prevention, forced file and directory deletion and file access blocking, file modification restriction, and isolation and storage depending on importance of the file, for example. Further, the process control operation as an operation of controlling a service and a process executed in the client terminal connected to the computing device 100 may include at least one of arbitrary process termination prevention, forced process termination, and process execution restriction, for example. Further, the network control operation as an operation of controlling the network of the terminal of the client connected to the computing device 100 may include, for example, network connection blocking, port opening restriction, blacklist IP blocking, blacklist domain blocking, AP connection blocking, and HTTP protocol blocking. The device control operation, the file control operation, the process control operation, and the network control operation are merely examples and the present disclosure is not limited thereto.

According to an exemplary embodiment of the present disclosure, the memory 220 may store information on the program code, monitoring information, a system monitoring policy, and information on client control executable in the processor 210. For example, the memory 220 may store the monitoring information which the processor 210 receives from the plurality of clients and the information on the system monitoring policy which the processor 210 generates based on the input of the administrator.

According to an exemplary embodiment of the present disclosure, the memory 220 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 220 on the Internet. The description of the memory is just an example and the present disclosure is not limited thereto.

According to an exemplary embodiment of the present disclosure, the network unit 230 may transmit and receive information to and from the computing device 100. More specifically, the network unit 230 may include a wired/wireless Internet module for network access. As the wireless Internet technology, wireless LAN (WLAN) (Wi-Fi), wireless broadband (Wibro), world interoperability for microwave access (Wimax), high speed downlink packet access (HSDPA), or the like, may be used. As wired Internet technology, a digital subscriber line (XDSL), fibers to the home (FTTH), power line communication (PLC), or the like may be used.

The network unit 230 may be positioned at a comparatively short distance from the user terminal including a short range communication module and transmit and receive data to and from an electronic apparatus including the short range communication module. As short-range communication technology, Bluetooth, radio frequency identification (RFID), infrared data association (IrDA), ultra wideband (UWB), ZigBee, or the like may be used.

Figure 3:
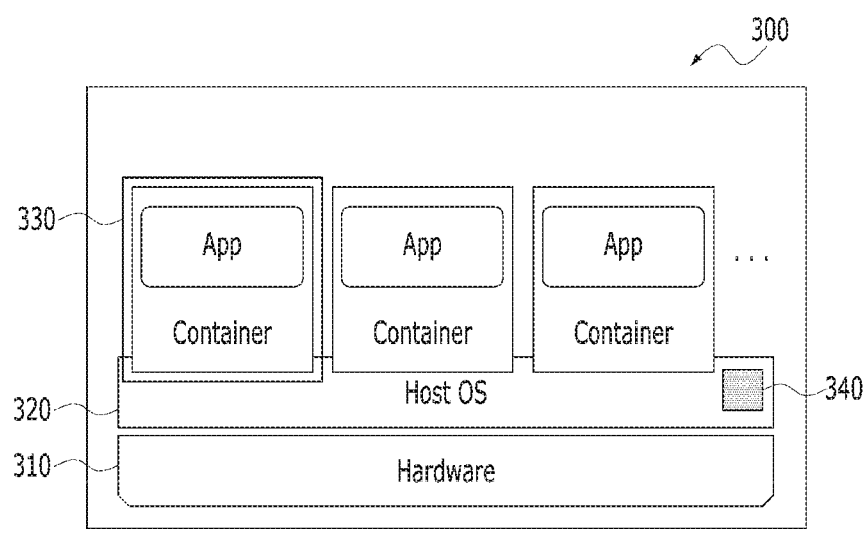
FIG. 3 is a detailed configuration diagram of a service server implemented in the form of a container-based cloud server according to an exemplary embodiment of the present disclosure.

FIG. 3 is a detailed configuration diagram of the service server implemented in the form of a container-based cloud server according to an exemplary embodiment of the present disclosure.

According to an exemplary embodiment of the present disclosure, the service server 10 may be implemented in the form of the container-based cloud server 300, as illustrated in FIG. 3. Hereinafter, a detailed method in which the computing device 100 obtains the monitoring information for detecting the system abnormality action from each of the plurality of clients through the service server 10 implemented in the form of the container-based cloud server 300 and controls the plurality of clients of the container-based cloud server 300 based on the obtained monitoring information will be described.

As illustrated in FIG. 3, the container-based cloud server 300 may include hardware 310 for constructing the container-based cloud server 300. In this case, the hardware 310 may include all physical components (devices) for constructing the cloud server and implement at least one function of input, calculation, control, storage, and output. For example, the hardware 310 may include a central processing unit (CPU), a random access memory (RAM), a graphics card, a hard disk drive (HDD), and the like. The container-based cloud server 300 may virtualize an OS environment itself such that each container 330 has a unique isolated space thereof so as to execute the plurality of containers in the host OS 320 provided in the hardware 310. Therefore, each of the containers 330 of the container-based cloud server 300 may be allocated resources such as the CPU, the RAM, a file system, a storage, or the network through the host OS and independently execute the application.

According to an exemplary embodiment of the present disclosure, the container-based cloud server 300 may obtain the monitoring information from the plurality of clients and transmit the obtained monitoring information to the computing device 100. Specifically, the container-based cloud server 300 may receive the monitoring information for each of the plurality of clients through an agent 340 installed in the host OS 320. In this case, the monitoring information may include resource information including information related with the resource of the client and operation information including information related with the operation of the client. The resource information included in the monitoring information may be information on a change quantity of resources which the plurality of respective clients connected to the host OS 320 uses for driving the application. For example, the resource information may include information on a utilization rate and a usage time of a CPU, a memory, a hard disk, or a network, which are changed when a client operates the application. The operation information included in the monitoring information may be information on operations performed by the plurality of respective clients connected to the computing device 100. Specifically, in the case of the operation information, the application executed by each client may include information which is changed based on at least one of an installation action, a deletion action, and a control action of the client. As a specific example, the basic container information may include information that the application is changed by at least one of the installation action, the deletion action, a change action, a connection action, a release action, and an access action of the client 110 for a device, a file, a process, a network and a shared directory operated in the application. The concrete description of the resource information and the operation information described above is only an example and the present disclosure is not limited thereto.

In one example of implementation of the present disclosure, the host OS 320 of the container-based cloud server 300 may be, for example, Linux. Accordingly, in the container-based cloud server 300, cgroups (control groups) of a Linux kernel may be used. The cgroups is the Linux kernel that groups each of the processes executed in the plurality of clients of the container-based cloud server 300 and isolates and divides the processes so as to measure the usage of system resources (CPU, memory, disk I/O network, etc.) of the process belonging to the corresponding group. In one example of the implementation of the present disclosure, the container-based cloud server 300 may monitor the information on the resource usage by reading a file by accessing a cgroups file system instead of calling a separate system library to monitor the resource usage through the cgroups. Hereinafter, the detailed method for monitoring the resource information by using the cgroups of the Linux kernel will be described in detail.

According to an exemplary embodiment of the present disclosure, the container-based cloud server 300 may monitor the memory usage of a specific container using the cgroups of the Linux kernel. For example, a command to monitor the memory usage of the specific container is as follows.

"/sys/fs/cgroup/memory/lxc/
10b0fb69677ef5e42cd8dc817b452e179104145a0 216 b6cb010c8ac0a9351208/memory.star"

In this case, "10b0fb69677ef5e42cd8dc817b452e179104145a0216 b6cb010c8ac0a9351208" included in the command may be a unique ID of the container.

The following result value may be obtained through input of such a command.

"total_cache 110592, total_rss 211771392"

In this case, total_rss among values output as the result may indicate the memory usage. Specifically, the container-based cloud server 300 may know that the specific container uses memory of 211771392 bytes, that is, approximately memory of 202 MB. Accordingly, the container-based cloud server 300 may monitor the resource for each of the clients (process group) among the plurality of containers using the cgroups of the Linux kernel. The specific command relating to the above-mentioned memory is only an example and the present disclosure is not limited thereto.

In the container-based cloud server 300 using Linux as the host OS, command lxc-info may be provided to ordinary users in order to conveniently and easily display resource information for each container without understanding the file system. Specifically, the command lxc-info may serve to directly parse contents of a resource information file located in /sys/fs/cgroup and summarize and output the contents so that the ordinary users may understand the contents even though the ordinary users do not deeply understand system terminologies. For example, when "lxc-info -n webserver" is input, the resource information of a container having a name of "webserver" is monitored to show a state of the corresponding container, a process ID, an IP address, a CPU usage, a memory usage, and the like as outputs. In addition to the above-described lxc-info, commands that may easily perform container creation/removal and management may be provided. The description of the aforementioned commands is just an example and the present disclosure is not limited thereto. In addition, the container-based cloud server 300 using Linux as the host OS may detect changes in files in a specific directory by using the inotify of the Linux kernel. Specifically, the inotify may obtain information about changes in the file system from the kernel and also obtain change information such as modification, deletion, creation, etc. of the file. Accordingly, the container-based cloud server 300 using Linux as the host OS may obtain the resource information and the operation information for determining the system abnormality action from each of the plurality of clients.

In another example of implementation of the present disclosure, the host OS 320 of the container-based cloud server 300 may be Windows. The container-based cloud server 300 having the Windows as the host OS 320 may obtain the monitoring information for each of the plurality of clients connected to the host OS 320 through the Windows management instrument). The WMI may be an infrastructure capable of obtaining management information on a resource in a Windows operating system. In this case, the obtained resource information may include OS, Bios, CPU, Memory, Disk, and Window service. In other words, since the WMI itself records the CPU usage, it is possible to obtain the resource information by periodically checking the value of the usage member in the class in the window environment.

The container-based cloud server 300 using the Windows as the host OS 320 may detect changes in files in a specific directory by using an API called ReadDirectoryChange. In this case, the inside of the specific directory may mean the inside of the specific client. The ReadDirectoryChange API may provide information about which file is changed and how the file is changed as well as simply notifying the file change inside the directory. Accordingly, the container-based cloud server 300 using the Windows as the host OS 320 may obtain the resource information and the operation information for determining the system abnormality action from each of the plurality of clients.

According to an exemplary embodiment of the present disclosure, the container-based cloud server 300 may obtain the monitoring information for each of the plurality of clients from the host OS 320 and transmit the obtained monitoring information to the computing device 100. Accordingly, the computing device 100 may detect the system abnormality based on the monitoring information received from the container-based cloud server 300.

According to an exemplary embodiment of the present disclosure, the computing device 100 may compare the monitoring information received from the container-based cloud server 300 with a predetermined system monitoring policy to determine whether the client violates the system monitoring policy. In detail, the computing device 100 may set the system monitoring policy based on the input to the administrator and compares the set system monitoring policy with the monitoring policy for each client received from the container-based cloud server 300 to determine which client violates the system monitoring policy.

In a case where the number of clients determined to violate the system monitoring policy is equal to or more than a predetermined number, the computing device 100 may determine that the system abnormality occurs. For example, in a case where the number of clients violating the system monitoring policy is predetermined as '5' and the number of clients violating the real-time system monitoring policy is '6', the computing device 100 may determine that the system abnormality occurs. As another example, in a case where the number of clients violating the system monitoring policy is predetermined as '8' and the number of clients violating the real-time system monitoring policy is '6', the computing device 100 may determine that the system abnormality does not occur.

The computing device 100 may transmit to the container-based cloud server 300 information to control some of the plurality of clients connected to the container-based cloud server 300. That is, the container-based cloud server 300 may control some of the plurality of clients connected to the container-based cloud server 300 based on the control information of the computing device 100.

According to an exemplary embodiment of the present disclosure, the container-based cloud server 300 with Linux as the host OS may control some clients among the plurality of clients connected to the container-based cloud server 300. Specifically, the restriction of the CPU and/or memory usage may be transferred from the host OS 1020 to each container via the command by using cgroups of the Linux kernel. For example, when the following cgroups command is executed, the maximum memory usage of the container having the name of "webserver" may be restricted to 2 MB.

"$echo 2000000>/sys/fs/cgroups/memory/webserver/memory.kmem.limit_inbytes"

In this case, when command '$echo 2000000' among the commands is changed to '$echo 3000000', the maximum memory usage may be restricted to 3 MB. As another example, the container-based cloud server 300 may control the network of each client by using application iptables. The iptables as one of Linux user programs may be allowed to control the network of the system by installing specific rules for the network by using framework netfilter of the Linux kernel. That is, the iptables may perform various desired actions by dividing packets according to various criteria such as a packet content (e.g., TCP port) according to a protocol and thus may serve as a network packet filter or a firewall. The command (program) iptables may actually have, for example, the following format.

"$ iptables -I INPUT -s 198.51.100.0 -j DROP"

An example of the command may refer to a command to add a rule to block all packets received from a host having an IP address of 198.51.100.0 to 10. Specifically, for each option, "-I INPUT" means that the rule corresponding to the command is added to a beginning part of a chain (firstly applied) and "-s [ip address] means that the corresponding IP address is made to correspond to a packet having a source address, and last, "-j DROP" represents a substantial action to filter and drop the packet at the time of receiving the corresponding packet. As other command options, there are "-p, --protocol" to select only a packet corresponding to a specific protocol, "-d, --destination" to select a packet based on a destination address, and "-i, --interface" to select only a specific network interface and set the selected network interface as a target. In the present disclosure, a special option which may correspond only to the specific protocol is used for implementing port control, in addition to a basic option. "--destination-port" assists serving to block a specific port as an option that may be applied when TCP or UDP is selected with the option "-p". By setting the rule using the command iptables as described above, the cloud server 300 according to an exemplary embodiment of the present disclosure may control the network which is one of assets of the system. The description of the network control of the container-based cloud server 300 is just an example and the present disclosure is not limited thereto.

That is, the container-based cloud server 300 may perform a plurality of control operations for some of the plurality of clients connected to the container-based cloud server 300 by using the cgroups and iptables application, and the like of the Linux kernel. In this case, the plurality of control operations may include at least one of the device control operation, the file control operation, the process control operation, and the network control operation. The device control operation as an operation of controlling a device connected to the terminal of the client connected to the computing device 100 may include at least one of a USB connection control, a smart phone connection control, a Bluetooth device control, an FDD device control, a DVD device control, an infrared control, a printer control, and a port control, for example. Further, the file control operation as an operation of controlling files and directories executed in the client terminal connected to the computing device 100 may include at least one of random file and directory deletion prevention, forced file and directory deletion and file access blocking, file modification restriction, and isolation and storage depending on importance of the file, for example. In addition, the process control operation as an operation of controlling a service and a process executed in the client terminal connected to the computing device 100 may include at least one of arbitrary process termination prevention, forced process termination, and process execution restriction, for example. The network control operation as an operation of controlling the network of the terminal of the client connected to the computing device 100 may include, for example, network connection blocking, port opening restriction, blacklist IP blocking, blacklist domain blocking, AP connection blocking, and HTTP protocol blocking. The device control operation, the file control operation, the process control operation, and the network control operation are merely examples and the present disclosure is not limited thereto.

Accordingly, the computing device 100 may receive the monitoring information from the plurality of clients connected to the container-based cloud server 300 through the container-based cloud server 300 and determine which client violates the system monitoring policy through the comparison of the received monitoring information and the predetermined system monitoring policy and control some clients of the plurality of clients based on the determination.

Figure 4:
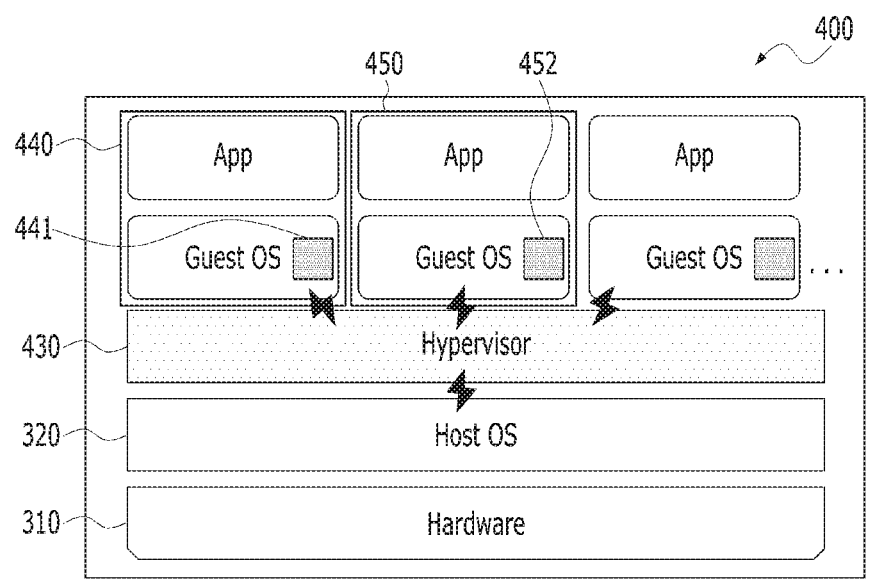
FIG. 4 is a detailed configuration diagram of a service server implemented in the form of a virtual machine-based cloud server according to an exemplary embodiment of the present disclosure.

FIG. 4 is a detailed configuration diagram of a service server implemented in the form of a virtual machine-based cloud server according to an exemplary embodiment of the present disclosure. The contents overlapping with those described in FIGS. 2 and 3 with reference to FIG. 4 will not be described again, but the differences will be mainly described below.

According to another exemplary embodiment of the present disclosure, the service server 10 may be implemented in the form of the virtual machine-based cloud server 400, as illustrated in FIG. 4. Hereinafter, a detailed method in which the computing device 100 obtains the monitoring information for detecting the system abnormality action from each of the plurality of clients through the service server 10 implemented in the form of the virtual machine-based cloud server 400 and controls the plurality of clients of the virtual machine-based cloud server 400 based on the obtained monitoring information will be described.

As illustrated in FIG. 4, the virtual machine-based cloud server 400 may include hardware constructing the virtual machine-based cloud server 400. In this case, the hardware 310 may include all physical components (devices) for constructing the cloud server and implement at least one function of input, calculation, control, storage, and output. For example, the hardware 310 may include a central processing unit (CPU), a random access memory (RAM), a graphics card, a hard disk drive (HDD), and the like. The virtual machine-based cloud server 400 may include a hypervisor 430, the hypervisor 430 may provide an independent virtual environment so as to drive respective operating systems of the plurality of virtual machines by allocating physical resources (hardware) to the virtual machines and installing separate guest OSs in the allocated virtual machines.

According to an exemplary embodiment of the present disclosure, the virtual machine-based cloud server 400 may obtain the monitoring information from the plurality of clients and transmit the obtained monitoring information to the computing device 100. Specifically, as illustrated in FIG. 4, the virtual machine-based cloud server 400 may allocate the virtual machine to each of the plurality of clients. For example, client 1 may be allocated to virtual machine 1 440 and client 2 may be allocated to virtual machine 2 450. In the case of the virtual machine-based cloud server 400, instead of sharing the host operating system through the kernel, the hardware 310 is allocated to each virtual machine. Therefore, in order to obtain the monitoring information of each client, the agent may be installed in each virtual machine. For example, agent 1 441 may be installed in guest OS 1, which is an operating system of virtual machine 1 440 and agent 2 452 may be installed in guest OS 2, which is an operating system of virtual machine 2 450. That is, the virtual machine-based cloud server 400 may receive the monitoring information from the individual clients by installing agents in the respective virtual machines. Hereinafter, a detailed method in which the virtual machine-based cloud server 400 receives the monitoring information from each client will be described.

In one example of implementation of the present disclosure, the guest OS of the virtual machine-based cloud server 400 may be, for example, Linux. Accordingly, the virtual machine-based cloud server 400 using Linux as the guest OS may receive the monitoring information from each client by using a proc file system itself. The proc file system is a file system for displaying a process and other system information in a hierarchical file structure format in a Unix-series operating system and is a file system designed for easily transmitting various data held by the kernel to a system administrator. By utilizing the proc file system, the monitoring information may be more easily received from each client in the Linux operating system in the present disclosure. That is, in order to collect the CPU, memory, disk I/O (storage) and network resource usage of each client to be monitored, the monitoring information for each client may be received in such a manner to read the contents by accessing the proc file system instead of a separate library call. More specifically, the host OS may send a request for receiving the monitoring information to the guest OS through the hypervisor 430 and the guest OS, which receives the request, may access the proc file system of the operating system and receive the monitoring information for each client and transmit the received monitoring information to the host OS. Accordingly, the virtual machine-based cloud server 400 may obtain the monitoring information for each of the plurality of clients through the proc file system and transmit the obtained monitoring information to the computing device 100. Accordingly, the computing device 100 may detect the system abnormality based on the monitoring information received from the virtual machine-based cloud server 400.

Figure 5:
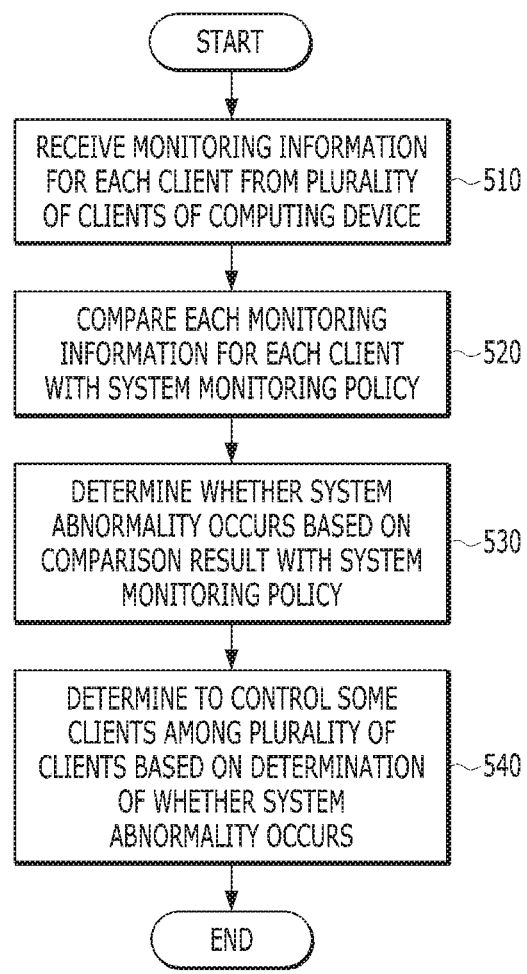
FIG. 5 is a flowchart of an operation in which a processor of a computing device detects system abnormalities occurring in a plurality of clients and controls a causative service according to an exemplary embodiment of the present disclosure.

FIG. 5 is a flowchart of an operation in which a processor of a computing device detects system malfunctions occurring in a plurality of clients and controls a causative service according to an exemplary of the present disclosure.

According to an exemplary embodiment of the present disclosure, the computing device 100 may detect system abnormalities in a plurality of clients and control the plurality of clients based on the detected system abnormalities. Specifically, the computing device 100 may determine whether the system malfunctions which occur in the plurality of clients occur. In this case, whether the system abnormalities occur may be determined based on a comparison of monitoring information and system monitoring policies for respective clients 110 from the plurality of clients connected to the computing device 100. In more detail, the computing device 100 may receive the monitoring information for each client 110 from the plurality of clients connected to the computing device 100. In addition, the computing device 100 may receive a system monitoring policy for identifying an abnormal action from an administrator. That is, the computing device 100 may determine whether the system abnormality occurs based on a comparison result between the monitoring information received from the plurality of clients and the system monitoring policy set based on an input of the administrator. In addition, when the computing device 100 determines that the system abnormality occurs, the computing device 100 may perform a plurality of control operations on some of the plurality of clients connected to the computing device 100.

Accordingly, the computing device 100 may detect the abnormal actions of the plurality of clients connected to the computing device 100 and when the abnormal action is detected, the computing device 100 performs an operation of controlling the plurality of clients to prevent the abnormal actions of individual clients from being transitioned to a network through the computing device 100 and prevent additional threats that may occur due to the abnormal actions.

The computing device 100 according to an exemplary embodiment of the present disclosure synthesizes the monitoring information from each client so that in spite of an operation other than the abnormal operation of each of individual clients, when a change occurs in the monitoring information concurrently in the plurality of clients, it is determined that a system is abnormal to detect the system abnormality which may be propagated through the network, such as ransomware or the like and take a control operation.

According to an exemplary embodiment of the present disclosure, the computing device 100 may receive the monitoring information for each client from the plurality of clients of the computing device 100 (510).

According to an exemplary embodiment of the present disclosure, the computing device 100 may receive the monitoring information for each client from the plurality of clients connected to the computing device 100. In this case, the monitoring information may include resource information and operation information. The resource information included in the monitoring information may be information on a change quantity of resources which the plurality of respective clients connected to the computing device 100 uses for driving the application. For example, the resource information may include information on a utilization rate and a usage time of a CPU, a memory, a hard disk, or a network, which are changed when a client 110 operates the application. The operation information included in the monitoring information may be information on operations performed by the plurality of respective clients connected to the computing device 100. Specifically, in the case of the operation information, the application executed by each client may include information which is changed based on at least one of an installation action, a deletion action, and a control action of the client 110. As a specific example, the basic container information may include information that the application is changed by at least one of the installation action, the deletion action, a change action, a connection action, a release action, and an access action of the client 110 for a device, a file, a process, a network, and a shared directory operated in the application. The concrete description of the resource information and the operation information described above is only an example and the present disclosure is not limited thereto.

According to another exemplary embodiment of the present disclosure, the computing device 100 may receive the monitoring information of each of the plurality of clients connected to the computing device 100 through a database. The database may be a device separate from the computing device. Further, the database may be an instance different the monitoring instance of the computing device. For example, the database may be Tibero of Tmax data. In more detail, the computing device 100 may determine whether the system for each client is abnormal based on the information received from the plurality of clients. As a result, since the computing device 100 needs to receive the monitoring information from all clients connected to the computing device 100, a larger load amount may be caused. Accordingly, the computing device 100 may receive the monitoring information of each of the plurality of clients in association with the database. More specifically, the monitoring information transmitted from the client may be stored in the database and the computing device 100 may request and receive required information from the database in which the monitoring information is stored. The computing device 100 receives the monitoring information of the plurality of clients with a small load amount through the database to detect the abnormal actions of the individual clients.

The computing device 100 may set the system monitoring policy based on the input of the administrator. In this case, the system monitoring policy may include a resource policy related with the resource of the client and an operation policy related with the operation of the client. The resource policy may include a policy related with whether a resource usage or a remaining amount of the client varies equal to or more than a predetermined threshold value during a predetermined period. More specifically, the resource policy may be a policy regarding a resource change quantity for a predetermined time of each of the plurality of clients connected to the computing device 100. For example, in a case where the resource usage of the client is changed by 50% or more for 10 seconds, the resource policy may be a policy to determine that the case is the abnormality. Further, for example, in a case where the resource usage of the client is more than the threshold value, the resource policy may be a policy to determine that the case is the abnormality. The action policy may include a policy related to an operation of the client 110 with respect to a storage space and may include a policy related to whether a predetermined action occurs a predetermined number of times or more during a predetermined period. More specifically, the action policy may be a policy as to whether the number of times that an administrator-specified action occurs is exceeded within a predetermined time with respect to each of the plurality of clients of the computing device 100. For example, in a case where 10 file change operations occur in each of the plurality of clients for 5 seconds, the operation policy may be a policy for determining the case as a policy violation. As another example, the operation policy may be set based on 15 file change operations in each of the plurality of clients for 3 seconds. The description of the resource policy and the operation policy is only an example and the present disclosure is not limited thereto.

According to an exemplary embodiment of the present disclosure, the computing device 100 may compare each monitoring information for each client with the system monitoring policy (520).

According to an exemplary embodiment of the present disclosure, the computing device 100 may compare the monitoring information for each client with the system monitoring policy. More specifically, the computing device 100 may compare a change amount of the resource information of the monitoring information for each client with a predetermined threshold change amount of the resource policy of the system monitoring policy. For example, when a resource policy as to whether the usage of the CPU is more than 70% for 10 minutes in each client is set in the computing device 100, information on the CPU usage is received from each client for 10 minutes which is previously set to compare whether the usage of the CPU is more than 70%. Specific numerical values relating to the resource policy are merely examples and the present disclosure is not limited thereto.

The computing device 100 may compare the operation information of the monitoring information for each client and the operation policy of the system monitoring policy. In detail, the monitoring information received from each client may be compared based on the operation policy set in the computing device 100. For example, when an operation policy as to whether the number of change times of a specific file is more than is 30 for 5 seconds in each client is set in the computing device 100, information on the file change is received from each client for 5 minutes which is previously set to compare whether the number of file change times is more than 30. Specific numerical values relating to the operation policy are merely examples and the present disclosure is not limited thereto. That is, the computing device 100 may compare the resource information and the resource policy and the operation information and the operation policy, respectively.

According to an exemplary embodiment of the present disclosure, the computing device may determine whether the system abnormality occurs based on the comparison result with the system monitoring policy (530).

The computing device 100 may determine that the system abnormality occurs when the number of clients that violate the system monitoring policy among the plurality of clients is equal to or more than a predetermined number. Specifically, the computing device 100 may determine the client that violates the system monitoring policy based on the comparison result of the monitoring information for each client and the system monitoring policy. In this case, the monitoring information may include the resource information and the operation information and the system monitoring policy may include the resource policy and the operation policy. In other words, the computing device 100 separately compares the resource information and the resource policy and the operation information and the operation policy to determine whether the resource information and the operation information violate the resource policy and the operation policy. For example, when the CPU usage of the client is equal to or more than 70%, if only the corresponding client has such monitoring information (CPU usage 70% or more), the corresponding client may perform a task requiring a lot of resources (that is, a normal operation). However, when the CPU usages of multiple clients concurrently increase, the computing device 100 may determine that the system abnormality occurs based on monitoring information that the CPU usages of the multiple clients concurrently increase.

The computing device 100 compares the resource information of each client with the resource policy to determine the client that violates the resource policy. Specifically, the computing device 100 may determine that the client violates the resource policy when the resource change amount is equal to or more than a predetermined threshold change amount of the resource policy. For example, when the computing device 100 pre-sets a resource policy that limits the CPU usage to 60% based on the input of the administrator, if the CPU usage of each client monitored in real time is 60% or more, the processor 210 may determine that the client with the CPU usage of 60% or more violates the resource policy. The concrete description of the resource information and the resource policy described above is only an example and the present disclosure is not limited thereto.

The computing device 100 compares the operation information of each client with the resource policy to determine the client that violates the operation policy. Specifically, when the operation information of each client includes information that violates a predetermined operation policy, the computing device 100 may determine that the client violates the operation policy. For example, when the operation policy preset through the computing device 100 is set based on an operation of performing file deletion 20 times for 3 seconds, in a case where the file deletion is performed 26 times for 3 seconds in the operation information of the specific client, the computing device 100 may determine that the specific client violates the operation policy. The concrete description of the operation information and the operation policy described above is only an example and the present disclosure is not limited thereto.

In a case where the number of clients violating the system monitoring policy is equal to or more than a predetermined number, the computing device 100 may determine that the system abnormality occurs.

Referring to FIG. 6, it can be seen that ten clients are connected to the computing device 100, as shown in the area of reference numeral 610. Further, information (reference numeral 620) on the CPU usage, information (reference numeral 630) on the file extension change number, and notification information (reference numeral 640) according to the abnormality detection for each of 10 clients may be displayed. For example, the CPU usage and the file extension change number of client 1 that is, C1 may be displayed as 50% and 18 based on the monitoring information on C1, respectively. That is, the processor 210 may determine that C1 does not violate the predetermined system monitoring policy (CPU usage 70% or more and 20 file extension changes or more). Therefore, "OFF" may be displayed in the notification information indicating the anomaly detection. As another example, the CPU usage and the file extension change number of C2 may be displayed as 76% and 25 based on the monitoring information for C2, respectively. That is, the processor 210 determines that C2 violates the predetermined system monitoring policy (CPU usage 70% or more and 20 file extension changes or more), and as a result, "ON" may be displayed in the notification information indicating the anomaly detection. As yet another example, in the case of C3, since the usage of the CPU is 70%, that is, equal to or more than the CPU usage (70%) of the predetermined policy, but the file extension change number is 15, that is, less than the predetermined policy (15 file extension changes), the computing device 100 may determine that C3 does not violate the predetermined system monitoring policy and display "OFF" in the notification information. Through the process of determining whether the system monitoring policy is violated, the computing device 100 may determine whether the system monitoring policy is violated for each of the plurality of (for example, ten) clients.

The computing device 100 may determine that the system abnormality occurs when the number of clients that violate the system monitoring policy among the plurality of clients is equal to or more than a predetermined number. For example, in a case where the number of clients violating the monitoring policy for determining that the system abnormality occurs is predetermined as '5', the computing device 100 may determine that the system abnormality occurs in the example of FIG. 6. As another example, in a case where the number of clients violating the monitoring policy for determining that the system abnormality occurs is predetermined as '6', the computing device 100 may determine that the system abnormality does not occur in the example of FIG. 6.

That is, the computing device 100 may compare the monitoring information with the system monitoring policy to determine whether each client violates the system monitoring policy and when the number of clients that violate the system monitoring policy is equal to or more than the predetermined number, the computing device 100 may determine that the system abnormality occurs.

Therefore, the computing device 100 may detect not only the system abnormalities occurring in the individual clients 110 but also the system abnormalities in local environments of the individual clients 110.

Since the restriction on the number of clients 110 determined to violate the system monitoring policy may be predetermined by the administrator, the restriction may be set differently according to the type of system abnormality to be detected. More specifically, when the system abnormality to be detected through the computing device 100 is a system abnormality expected to cause serious damage, the restriction on the number of clients 110 that violate the system monitoring policy is minimized and when the system abnormality to be detected through the computing device 100 is a system abnormality expected not cause the serious damage, the restriction on the number of clients 110 that violate the system monitoring policy may be more relaxed and predetermined. As a specific example, when a response is delayed, such as ransomware, in the case of a system abnormality which causes the serious damage to the entire network, a threshold value of the number of clients violating the monitoring policy, which is used for determining the system abnormality may be set to be small so that the computing device 100 determines that the system abnormality occurs immediately when even one client violates the system monitoring policy. On the other hand, in the case where the abnormal action to be detected is not expected to cause the serious damage to the plurality of clients, a determination condition is relaxed so that when 20 clients violate the system monitoring policy, the computing device 100 may be set to determine that the system abnormality occurs. Therefore, it may be possible to set individual conditions for each type of system abnormality.

According to an exemplary embodiment of the present disclosure, the computing device may determine to control some clients among the plurality of clients based on the determination of whether the system abnormality occurs (540).

According to an exemplary embodiment of the present disclosure, the computing device 100 may determine to control at least one group of a client group in which the abnormality occurs and a client group in which the abnormality does not occur among the plurality of clients, based on the type of occurring system abnormality. For example, if the occurring system abnormality is ransomware, the computing device 100 may determine to control the client group in which the abnormality occurs. In this case, the computing device 100 may block the network connection of the client group already infected with the ransomware. The computing device 100 may primarily shut down the driving of the ransomware by terminating and restarting the instance of the client group when the file change by the ransomware continues in the client group infected with the ransomware. As another example, when the occurring system abnormality is a malware infection due to a security flaw, the computing device 100 may determine to control the client group in which the abnormality does not occur. The concrete description of the system abnormality is merely an example and the present disclosure is not limited thereto.

According to an exemplary embodiment of the present disclosure, the computing device 100 may control some clients among the plurality of clients. More specifically, the computing device 100 may perform a plurality of control operations for some clients among the plurality of clients. The plurality of control operations may include at least one of the device control operation, the file control operation, the process control operation, and the network control operation. In this case, the device control operation as an operation of controlling a device connected to the terminal of the client connected to the computing device 100 may include at least one of a USB connection control, a smart phone connection control, a Bluetooth device control, an FDD device control, a DVD device control, an infrared control, a printer control, and a port control, for example. In this case, the file control operation as an operation of controlling files and directories executed in the client terminal connected to the computing device 100 may include at least one of random file and directory deletion prevention, forced file and directory deletion and file access blocking, file modification restriction, and isolation and storage depending on importance of the file, for example. Further, the process control operation as an operation of controlling a service and a process executed in the client terminal connected to the computing device 100 may include at least one of arbitrary process termination prevention, forced process termination, and process execution restriction, for example. Further, the network control operation as an operation of controlling the network of the terminal of the client connected to the computing device 100 may include, for example, network connection blocking, port opening restriction, blacklist IP blocking, blacklist domain blocking, AP connection blocking, and HTTP protocol blocking. The device control operation, the file control operation, the process control operation, and the network control operation are merely examples and the present disclosure is not limited thereto.

Figure 7:
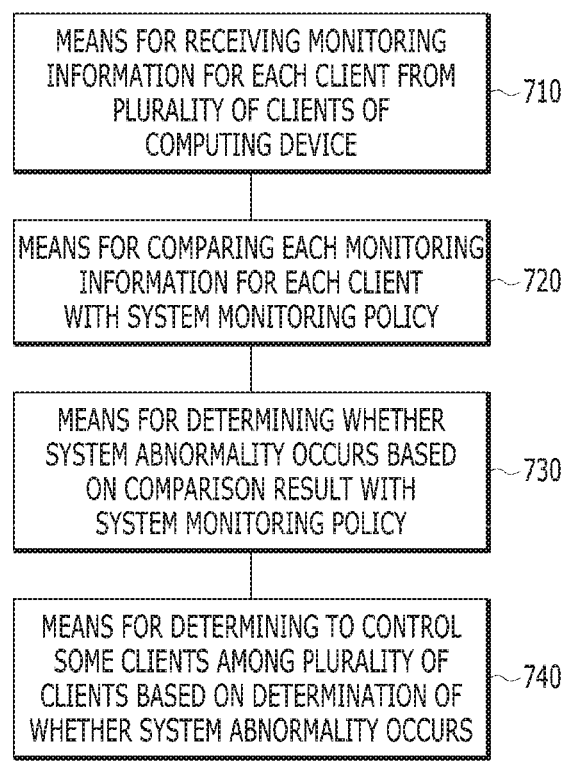
FIG. 7 is a diagram illustrating a means in which a processor of a computing device detects system abnormalities occurring in a plurality of clients and controls a causative service according to an exemplary embodiment of the present disclosure.

FIG. 7 is a diagram illustrating a means in which a processor of a computing device detects system malfunctions occurring in a plurality of clients and controls a causative service according to an exemplary embodiment of the present disclosure.

According to an exemplary embodiment of the present disclosure, the computing device 100 may include a means 710 for receiving monitoring information for each client from a plurality of clients of the computing device in order to detect the system abnormality, a means 720 for comparing each of the monitoring information for each client with the system monitoring policy, a means 730 for determining whether the system abnormality occurs based on the comparison result with the system monitoring policy, and a means 740 for determining to control some of the plurality of clients based on whether the system abnormality occurs.

Alternatively, the monitoring information may include at least one of resource information including information related with the resource of the client and operation information including information related with the operation of the client.

Alternatively, the system monitoring policy may include at least one of a resource policy related with the resource of the client and an operation policy related with the operation of the client.

Alternatively, the resource policy may include a policy related to whether the resource usage or the remaining amount of the client fluctuates to a predetermined threshold value or more for a predetermined first time period and the operation policy may include a policy related to the operation of the client to the storage space and may include a policy related to whether the predetermined operation occurs at a predetermined number of times or more for a predetermined second time period.

Alternatively, the means for determining whether the system abnormality occurs based on the comparison result with the system monitoring policy may include a means for determining that the system abnormality occurs when the number of clients violating the system monitoring policy is equal to or more than a predetermined number.

Alternatively, the means for comparing each of the monitoring information for each client with the system monitoring policy may include a means for comparing a change amount of the resource information of the monitoring information for each client with a predetermined threshold change amount of the resource policy of the system monitoring policy and a means for determining that the client violates the system monitoring policy when the amount of change in the resource information is equal to or more than the predetermined threshold change amount of the resource policy.

Alternatively, the means for comparing each of the monitoring information for each client with the system monitoring policy may include a means for comparing the operation information of the monitoring information for each client with the operation policy of the system monitoring policy and a means for determining that the client violates the operation policy when the operation information includes information that violates the operation policy.

Alternatively, the means for determining to control some clients of the plurality of clients based on the determination as to whether the system abnormality occurs may include a means for determining to control at least one group of a client group in which the abnormality occurs and a client group in which the abnormality does not occur among the plurality of clients based on the type of occurring system abnormality.

Alternatively, the means for determining to control at least one group of the client group in which the abnormality occurs and the client group in which the abnormality does not occur among the plurality of clients based on the type of occurring system abnormality may include a means for determining to control the client group in which the abnormality occurs when the type of occurring system abnormality is an abnormality which influences the client in which the abnormality occurs itself and a means for determine to control at least one group of the client group in which the abnormality occurs and the client group in which the abnormality does not occur when the type of occurring system abnormality is an abnormality which influences another client.

Alternatively, the control for the client may include at least one of device control, file control, process control, and network control for some clients of the plurality of clients.

Figure 8:
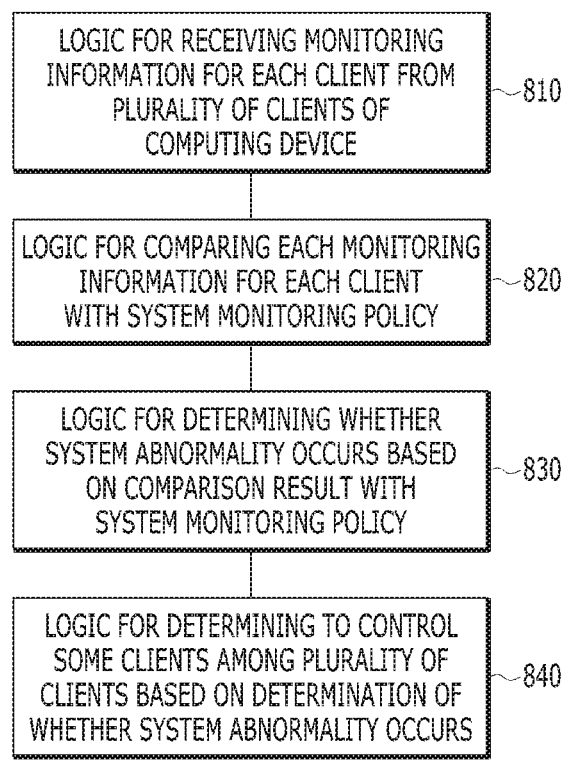
FIG. 8 is a diagram illustrating a module in which a processor of a computing device detects system abnormalities occurring in a plurality of clients and controls a causative service according to an exemplary embodiment of the present disclosure.

FIG. 8 is a diagram illustrating a module in which a processor of a computing device detects system malfunctions occurring in a plurality of clients and controls a causative service according to an exemplary embodiment of the present disclosure.

According to an exemplary embodiment of the present disclosure, the computing device 100 may include a module 810 for receiving monitoring information for each client from a plurality of clients of the computing device in order to detect the system abnormality, a module 820 for comparing each of the monitoring information for each client with the system monitoring policy, a module 830 for determining whether the system abnormality occurs based on the comparison result with the system monitoring policy, and a module 840 for determining to control some of the plurality of clients based on whether the system abnormality occurs.

Figure 9:
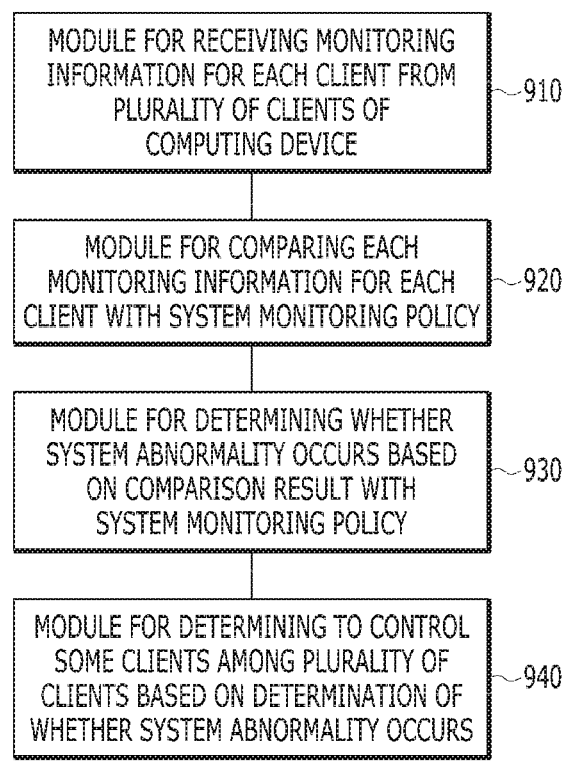
FIG. 9 is a diagram illustrating a logic in which a processor of a computing device detects system abnormalities occurring in a plurality of clients and controls a causative service according to an exemplary embodiment of the present disclosure.

FIG. 9 is a diagram illustrating a logic in which a processor of a computing device detects system malfunctions occurring in a plurality of clients and controls a causative service according to an exemplary embodiment of the present disclosure.

According to an exemplary embodiment of the present disclosure, the computing device 100 may include a logic 910 for receiving monitoring information for each client from a plurality of clients of the computing device in order to detect the system abnormality, a logic 920 for comparing each of the monitoring information with the system monitoring policy for each client, a logic 930 for determining whether the system abnormality occurs based on the comparison result with the system monitoring policy, and a logic 940 for determining to control some of the plurality of clients based on the determination of whether the system abnormality occurs.

Figure 10:
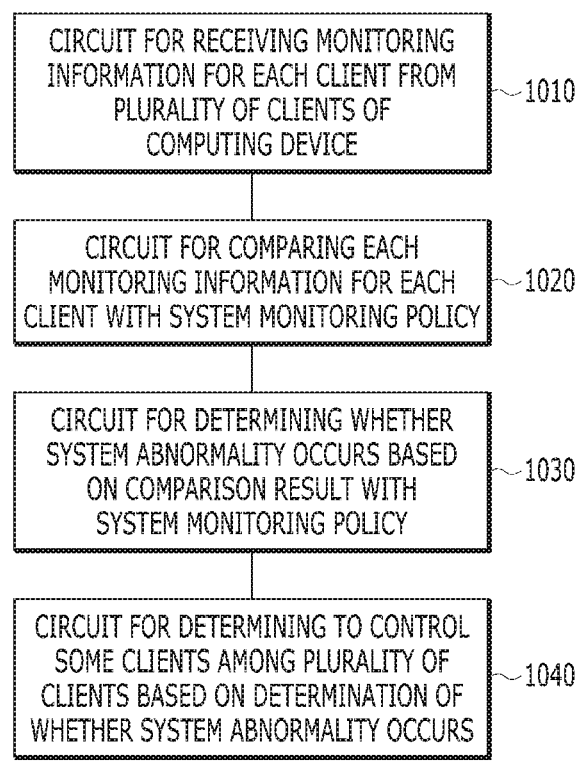
FIG. 10 is a diagram illustrating a circuit in which a processor of a computing device detects system abnormalities occurring in a plurality of clients and controls a causative service according to an exemplary embodiment of the present disclosure.

FIG. 10 is a diagram illustrating a circuit in which a processor of a computing device detects system malfunctions occurring in a plurality of clients and controls a causative service according to an exemplary embodiment of the present disclosure.

According to an exemplary embodiment of the present disclosure, the computing device 100 may include a circuit 1010 for receiving monitoring information for each client from a plurality of clients of the computing device in order to detect the system abnormality, a circuit 1020 for comparing each of the monitoring information with the system monitoring policy for each client, a circuit 1030 for determining whether the system abnormality occurs based on the comparison result with the system monitoring policy, and a circuit 1040 for determining to control some of the plurality of clients based on the determination of whether the system abnormality occurs.

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application, but such implementation decisions should not be interpreted as causing a departure from the scope of the present disclosure.

Figure 11:
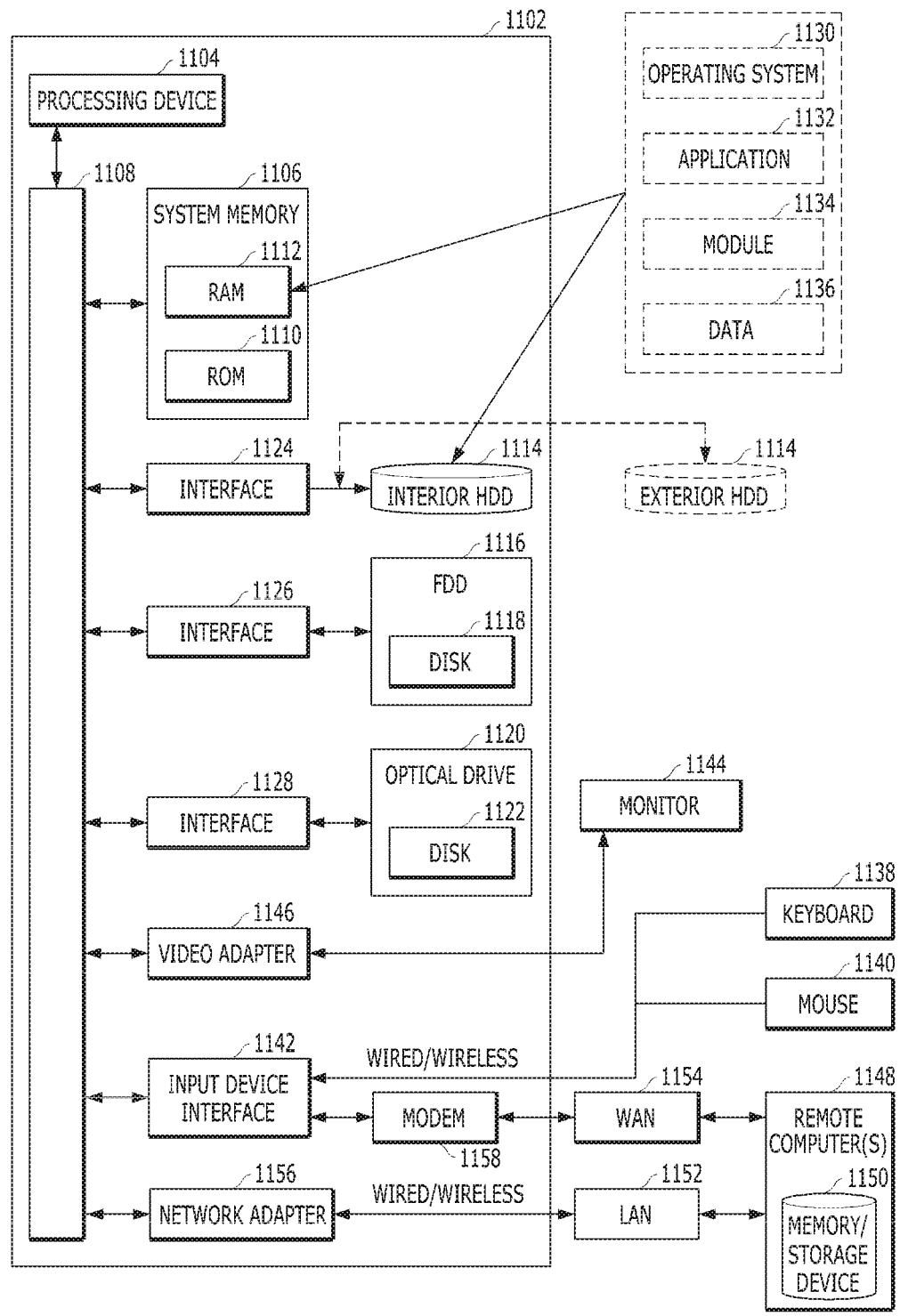
FIG. 11 is a simple and general schematic view of an exemplary computing environment in which exemplary embodiments of the present disclosure may be implemented.

FIG. 11 is a simple and general schematic view of an exemplary computing environment in which exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or as a combination of hardware and software.

In general, the module in the present specification includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include both computer readable storage media and computer readable transmission media.

The computer readable storage media include volatile and non-volatile media, temporary or non-temporary media, and movable and non-movable media implemented by a predetermined method or technology for storing information such as a computer readable command, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As not a limit but an example, the computer readable transmission media include wired media such as a wired network or a direct-wired connection and wireless media such as acoustic, RF, infrared and other wireless media. A combination of anymedia among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive (HDD) 1114 may also be configured for an external purpose in an appropriate chassis (not illustrated)—, a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an external drive includes, for example, at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of storage media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology such as a device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

Those skilled in the art of the present disclosure will appreciate that various exemplary logic blocks, modules, processors, means, circuits, and algorithm steps described in association with the embodiments disclosed herein can be implemented by electronic hardware, various types of programs or design codes (designated as "software" herein for easy description), or a combination of all thereof. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. The term "machine-readable media" include a wireless channel and various other media that can store, possess, and/or transfer command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be analyzed within the widest range which is coherent with the principles and new features presented herein.

What is claimed is:

1. A computer program stored in a non-transitory computer-readable storage medium, including encoded commands, which causes one or more processors to perform operations for detecting a system abnormality in the computing device when the computer program is executed by the one or more processors of a computer device, wherein the operations comprise:
   an operation of receiving monitoring information for each client from a plurality of clients of the computing device;
   an operation of comparing each monitoring information for each client with a system monitoring policy;
   an operation of determining whether the system abnormality occurs based on a comparison result with the system monitoring policy; and
   an operation of determining to control some clients among the plurality of clients based on the determination of whether the system abnormality occurs;
   wherein the operation of determining to control some clients among the plurality of clients includes:
      an operation of determining to control the client group in which the abnormality occurs when the type of occurring system abnormality is an abnormality which influences a client in which the abnormality occurs itself, and
      an operation of determining to control at least one group of the client group in which the abnormality occurs and the client group in which the abnormality does not occur when the type of occurring system abnormality is an abnormality which influences another client.

2. The computer program of claim 1, wherein the monitoring information includes at least one of resource information including information related with a resource of the client and operation information including information related with an operation of the client.

3. The computer program of claim 2, wherein the operation of comparing each monitoring information for each client with the system monitoring policy includes
an operation of comparing a change amount of the resource information of the monitoring information for each client and a predetermined threshold change amount of the resource policy of the system monitoring policy, and
an operation of determining that the client violates the system monitoring policy when the change amount of the resource information is equal to or more than the predetermined threshold change amount of the resource policy.

4. The computer program of claim 2, wherein the operation of comparing each monitoring information for each client with the system monitoring policy includes
an operation of comparing the operation information of the monitoring information for each client and the operation policy of the system monitoring policy, and
an operation of determining that the client violates the operation policy when the operation information includes information which violates the operation policy.

5. The computer program of claim 1, wherein the system monitoring policy includes at least one of a resource policy related with the resource of the client and an operation policy related with the operation of the client.

6. The computer program of claim 5, wherein the resource policy includes a policy related to whether a usage or a remaining amount of the resource of the client fluctuates to a predetermined threshold value or more for a predetermined first time period, and
the operation policy includes a policy regarding an operation of the client to a storage space and includes a policy related to whether a predetermined operation occurs a predetermined number of times or more for a predetermined second time period.

7. The computer program of claim 1, wherein the operation of determining whether the system abnormality occurs based on the comparison result with the system monitoring policy includes an operation of determining that the system abnormality occurs when the number of clients violating the system monitoring policy is equal to or more than a predetermined number.

8. The computer program of claim 1, wherein the control for the client includes at least one of device control, file control, process control, and network control for some clients of the plurality of clients.

9. A method for detecting a system abnormality, which is performed by a computing device, the method comprising:
receiving monitoring information for each client from a plurality of clients of the computing device;
comparing each monitoring information for each client with a system monitoring policy;
determining whether the system abnormality occurs based on a comparison result with the system monitoring policy; and
controlling some clients among the plurality of clients based on the determination of whether the system abnormality occurs;
wherein the controlling some clients among the plurality of clients includes:
controlling the client group in which the abnormality occurs when the type of occurring system abnormality is an abnormality which influences a client in which the abnormality occurs itself; and
controlling at least one group of the client group in which the abnormality occurs and the client group in which the abnormality does not occur when the type of occurring system abnormality is an abnormality which influences another client.

10. A computing device for detecting a system abnormality, the computing device comprising:
a processor including one or more cores;
a memory storing commands executable by the processor; and
a network unit permitting communication with a plurality of clients,
wherein the processor
receives monitoring information for each client from a plurality of clients of the computing device,
compares each monitoring information for each client with a system monitoring policy,
determines whether the system abnormality occurs based on a comparison result with the system monitoring policy, and
determines to control some clients among the plurality of clients based on the determination of whether the system abnormality occurs;
wherein the determining to control some clients among the plurality of clients includes:
determining to control the client group in which the abnormality occurs when the type of occurring system abnormality is an abnormality which influences a client in which the abnormality occurs itself, and
determining to control at least one group of the client group in which the abnormality occurs and the client group in which the abnormality does not occur when the type of occurring system abnormality is an abnormality which influences another client.

* * * * *